Feb. 20, 1934.  B. F. HOPKINS ET AL  1,948,176
METHOD OF MAKING CONNECTING RODS
Filed Jan. 7, 1932
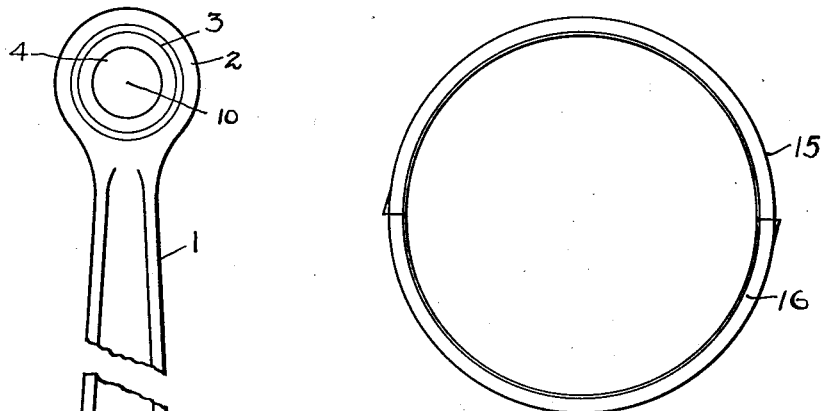
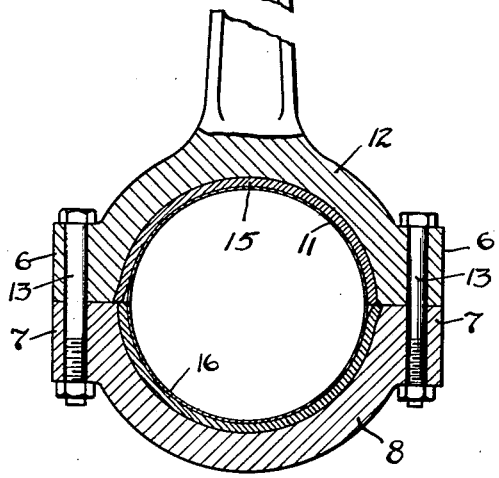
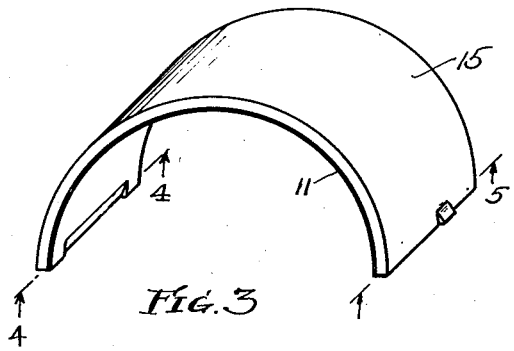
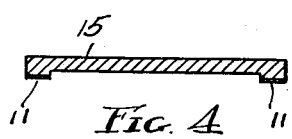
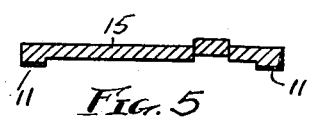
INVENTORS
Benjamin F. Hopkins and
John V. O. Palm
BY
Fay, Oberlin & Fay
ATTORNEYS.

Patented Feb. 20, 1934

1,948,176

UNITED STATES PATENT OFFICE 1,948,176

METHOD OF MAKING CONNECTING RODS

Benjamin F. Hopkins and John V. O. Palm, Cleveland Heights, Ohio, assignors to The Cleveland Graphite Bronze Company, Cleveland, Ohio, a corporation of Ohio Application January 7, 1932. Serial No. 585,342

2 Claims. (Cl. 29—152)

The present invention, relating as indicated to a method of making connecting rods for internal combustion engines and the like, is more particularly directed to a method of finishing the rod by assembling therein a thin-wall precision bearing which will permit of numerous advantages to be enumerated hereinafter.

To the accomplishment of the foregoing and related ends, said invention, then, consists of the means hereinafter fully described and particularly pointed out in the claims; the annexed drawing and the following description setting forth in detail one method and one product constituting, however, but one of various applications of the principles of our invention.

In said annexed drawing:—

Fig. 1 is a front elevation partially in section of our improved connecting rod; Fig. 2 is a front elevation of the thin-walled bearing of our connecting rod; Fig. 3 is a view in perspective of one of the half bearings for use in our rod; and Figs. 4 and 5 are sections on the lines 4—4 and 5—5 in Fig. 3, respectively.

In substantially all internal combustion engines it is now standard practice to cast babbitt or similar bearing metal directly into, and integral with, the lower end of the rod, or, if the rod is split at the lower end, then the babbitt is cast directly into the end in a suitable fixture and the cap is babbitted separately. If the rod is not split before the babbitting, it is subsequently split to produce the cap, and cap and rod are then finished to provide means for permitting their reassembly.

Integrally cast babbitt linings are generally satisfactory in operation at low and medium engine speeds, but at high engine speeds babbitt so cast has often been found unsatisfactory, particularly at the present high speeds and pressures which are employed. At the present time acute trouble is being experienced by manufacturers of internal combustion engines with integrally cast babbitt linings in connecting rods. To cast babbitt directly into a connecting rod, the connecting rod is cleaned, fluxed, dipped into a tin bath and then mounted in a fixture. It is connected in this fixture and babbitt is cast against the inner surface of the hole in the lower end of the rod. Upon the removal of the rod from the fixture and cooling of the babbitt, the rod end is bored in a jig to bring the hole in the babbitt lining the proper distance from the center of the hole in the top end of the rod. It is obvious that as the inner wall of the original hole in the lower end of the rod is rarely smooth or accurate, the lining cast into this wall will not be concentric when the final shaft hole is bored into the lining as this hole is located not from the wall of the hole in the rod, but from the center of the hole in the upper end of the rod. This results in a very considerable iregularity in the wall thickness in the babbitt which varies from .005 to .030, causes a wide difference in the strength of the bearing and its ability to withstand heavy loads, and results in an uneconomic waste of the expensive babbitt.

A further disadvantage in cast-in bearings for rods is the inability to secure even cooling of the babbitt due to the irregular shape and the irregular distribution of the metal in the lower end of the connecting rod. This produces unevenness in the babbitt crystal size, in babbitt structure and in the bond between the babbitt and the rod; this lack of uniformity is highly detrimental.

In order to avoid the irregular operation of a motor, pump, or the like, which would result from any considerable variation in the reciprocating weights, that is, of the piston and rod, it is customary to selectively assemble the rods into a motor or the like by weighing them and then picking those which are within certain weight limits and using only rods within certain weight limits for one motor and rods within other weight limits for another. In this way it is possible to closely approximate the weights in the various rods, and some manufacturers carry their selection further and maintain a weight limit for a given set of rods of a small fraction of the total weight of the entire rod. The trend of design goes even further in this respect, to maintain limits not only on weight but on balance, i. e., the distribution of that weight, by so machining the rod that its center of gravity is uniformly placed within close limits. It is therefore evident that, when subsequently, a connecting rod bearing is burned or worn out in service, and the rod must be rebabbitted in the field, it will of course not be possible to determine the weight or balance of the rod as the babbitt has partly or wholly run out of the rod end. It is therefore a matter of chance only if the rebabbitted rod has the same approximate weight or balance as before, and the result is that a motor, after such rebabbitting of a rod, would rarely have the same relation of weight and balance in its reciprocating parts with results to the smoothness of operation which will be obvious.

Connecting rods, particularly in internal combustion engines of current manufacture, are under heavy stress and are frequently burned or worn out. It is impractical for the ordinary repair shop or garage to maintain babbitting equipment for the rebabbitting of rods which have been burned or worn out, and the following procedure is the customary procedure. The garage man takes the old rod to a service station which represents the manufacturer of the engine or of the vehicle, and exchanges the old rod for a replacement rod, or, he goes to the agency which makes a business of selling replacement rods in exchange for old rods, or else he goes to a repair shop which merely melts out the old babbitt and rebabbitts the same rod.

Manifestly, the companies which make a business of rebabbitting and selling replacement rods, and the repair-shops which rebabbitt rods, are subject to all the difficulties and disadvantages hereinbefore referred to, as to irregularity in the wall thickness of the babbitt, uneven cooling, irregular babbitt structure and uneven bond, and of course, in many cases are not as well equipped as the original manufacturer to do the work.

In order to substitute a replacement rod for a rod which has been burned or worn out, or in order to have such burned or worn-out rod rebabbitted, it is necessary to take off the connecting rod cap, remove rod and piston from the engine, remove the piston pin, assemble the new rod with the pin and piston, (this usually requires careful fitting of the bushing in the top end of the replacement rod), replace the assembly in the engine, and finally bolt the cap in place. This practice obviously causes considerable delay and expense in placing the motor back in service, especially in districts which are remote from service stations or rebabbitting stations.

The greatest objection to the present practice and type of rods is the immense amount of money invested in stocks of all sizes and makes of connecting rods all over the world in order to secure rapid replacement of a burned or worn out rod, and this represents a very heavy investment both for the engine manufacturer and for the intermediate agents who stock and service these rods, while the result to the owner of the engine is unsatisfactory, both in cash cost and loss of time. Loss of time is particularly costly in the operation of truck or bus fleets, tractors and farm implements.

There is also an actual limit to the number of rebabbitting operations which may be performed on a single rod as it is customary in the field to make adjustments of the rods by removing the cap and filing down the parting line edges. After several adjustments sufficient metal has been removed so that the rod can no longer be rebabbitted and hence a given rod can be used as a replacement only a limited number of times. Burned out or worn out rods are returned to the manufacturers' service station in exchange for new rods, and the service station in turn sends the old rods to the manufacturer for credit. Those which have had excess filing must be scrapped and are a complete loss. All manufacturers recognize this loss, which amounts to many thousands of dollars per year, and rebabbitting stations must suffer similar loss.

While, as stated, the practice of babbitting directly into the rod has almost entirely superseded the use of removable lined bronze bearings, in a few cases such removable bearings are still employed. The disadvantages are the cost and the fact that even if these bearings are attempted to be held to precision limits, they are not interchangeable in the same sense that our improved bearings, later to be described, are interchangeable. In certain V-type engines the connecting rods opposite each other are attached to the same crankpin; one rod is forked, the other straight, the forked rod holding a split bronzeback babbitt-lined bearing on whose inner surface the crankpin rotates; the straight rod oscillates on the outer surface of the bearing between the clamping sides of the forked rod. The bearing section is heavy to give it the strength necessary to withstand the distortion inherent in a design of this type. It is attempted to hold these bearings to precision limits but being heavy flanged bearings they are extremely difficult to manufacture with the proper accuracy. They are therefore machined in pairs and are maintained in the same relationship during finish machining and stocking, one end of each half bearing being marked with an identification stamp to indicate the proper relationship of the two halves when assembled in the engine. If assembled incorrectly they do not provide a true cylindrical hole and do not fit securely into the hole in a rod. In no case are such half-bearings individually interchangeable and capable of being substituted in halves in existing rods for the bearings which are removed therefrom.

Our improved rod and method of manufacturing represents a very decided improvement over the practice now in use and produces a rod which is not only less expensive to manufacture but is very much easier to service or to replace, and one which requires in service stock only a fraction of the investment now represented by the reservoirs of connecting rods all over the world.

To manufacture our improved rod we take the ordinary forged rod, machine an accurate hole in the lower end, which hole has its center accurately spaced the desired distance from the center of the hole in the upper end, and then mount in the machined and accurate lower end hole two flexible thin-walled semi-cylindrical liners, which jointly constitute a complete cylindrical liner which will require no further machining or even adjustment to bring into a concentric condition with respect to the desired center of the opening in the lower end of the rod.

Referring now to Fig. 1, there is shown a connecting rod 1 of conventional structure provided in the upper end 2 with a bushing 3, and subsequently with a pin 4 for assembling the rod in the bosses of the piston. The lower end of the rod is provided with diametrically opposed bosses 6 and 7 on either side which permit of the mounting on the lower end of the rod of a cap 8 for securing the bearings into place about the crankpin. As already briefly explained, the lower end of the rod is prepared for the mounting of our improved bearings by first accurately machining a hole in the upper end of the rod and then locating from the center 10 of this hole to machine an accurate truly cylindrical hole 11 in the lower end of the rod, which is made up of the yoke 12 and removable cap 8, which are of course assembled and held in position by means of the bolts 13, as shown in Fig. 1. After the hole 11 has been accurately formed in the lower end of the rod, we remove the cap 8 and mount a semi-cylindrical half bearing, to be presently described, in the open end of the yoke 12 and in the cap 8, after which the cap and half-bearing therein are assembled in the manner shown in Fig. 1, with the two half-bearings 15 and 16 in a concentric relation with respect to the inner wall of the lower end of the rod and of course the center of the opening therethrough.

Our improved bearing consists of a metal backing or base of a material having a relatively high modulus of elasticity and a thin facing or lining of bearing metal, such as babbitt, of uniform structure, integrally united to the face of the sheet metal backing to produce a finished bearing element having an angular length of approximately 180°, a uniform thickness over its entire bearing area, both of the backing metal and of the bearing metal, and a composite thickness which should be sufficient for any metal selected to permit of convenient assembling with the pressure available in the cap bolts 13 to compress the two half bearings into a full and complete seat against the wall of the connecting rod. When we refer to uniform wall thickness we exclude, of course, those portions of the bearing wall taken up by the oil holes or grooves and those portions adjacent the parting line edges which are sometimes relieved to prevent scraping of oil from the shaft. These bearings are what we term precision bearings, that is, they are manufactured to extremely close limits as regards total wall thickness; when assembled as described in the rod they decrease the diameter of the hole therein, but they at no point vary the concentricity of the inner surface of the bearing with respect to the center of the original hole and require no machining, finishing or adjusting for assembly into the rod end and give desired predetermined clearance within allowed limits between bearing wall and shaft. In some instances shims are inserted between the abutting faces of the cap and rod (but not between the parting line edges of the bearing), and removal of one or more shims modifies the vertical diameter of the bore inserted therein, but this practice does not otherwise modify the accuracy, use or advantage of our bearings.

Precision bearings are made to such a degree of accuracy that when one is substituted for another the oil clearance is not varied beyond permissible limits. These bearings are furthermore so uniform in the above characteristics that any pair may be substituted for any other pair as they are interchangeable and any half bearings may be substituted for any other corresponding half. Therefore, upon failure of any bearing, a new stock bearing may be substituted with no further delay than that required to take off the connecting rod cap and replace the burned out or worn out section with a new bearing of the same dimensions as before. No disassembly of rod and pin from piston is necessary. As the bearings are precision bearings and are interchangeable, no variation is effected in the weight of the reciprocating parts by the substitution of one bearing for another and the motor in which the substitution is made will therefore have the same uniformity and relation between reciprocating weights in the various cylinders that it had when originally assembled. While for all ordinary conditions we employ bearings which are interchangeable in size, (neglecting oil grooves, etc.) in both upper and lower halves of the lower hole in the rod, this is not necessary, nor is it essential in all cases that the bearings have concentric inner and outer walls, so long as they may be assembled in the rod to provide a predetermined distance between centers of the upper and lower holes in the rod.

It will be understood that throughout the specification where we have used the terms "accurate", "uniform wall thickness", these terms involve slight variations from an exact dimension within prescribed limits which vary somewhat for the various dimensions of the bearings. For example, the center to center distance between upper and lower holes in the connecting rod is currently described to within five one-thousandths of an inch. The diameter of the hole in the large end of a connecting rod with our liners in place is prescribed within one-thousandth of an inch. The shaft diameter is ordinarily held accurate to within one-thousandth of an inch, and the oil clearance permitted between shaft and bearing usually varies between one-thousandth and three-thousandths of an inch. The wall thickness of our bearing is uniform within a tolerance of plus one-fourth of one-thousandth of an inch and with no minus tolerance, except that the bearings are sometimes relieved and hence the wall thickness reduced for short distances adjacent to the parting line edges. These various tolerances or permissible variations from exact dimensions must be understood in construing the terms "exact", "uniform", etc., as herein used.

An additional advantage of the present invention resides in the fact that our improved precision bearings may be made of relatively slight thickness, particularly if materials of a high modulus of elasticity are employed in the backing metal, such for example as steel. By reason of this lessened thickness, the bearings may frequently be employed as replacement bearings in connecting rods formerly having cast-in babbitt linings. Where the lining is worn or burned out, the remainder of the babbitt may be removed, the hole finished accurately to a given dimension slightly larger than its original finish, and our new improved precision bearings of given thickness then substituted for the cast-in babbitt linings formerly used. In this manner no change is made of course in the inside diameter of the hole in the assembled bearings in the rod and the combination of rod and precision bearing may therefore be replaced in the motor with an accurate fit around the shaft. The advantage of this simple replacement, which may sometimes be effected with no machining of the hole in the rod end, except for the removal of any remaining babbitt, presents obvious advantages which have already been referred to above, both in the manner of expense and in the saving of time during which the motor is out of service for the substitution of a new babbitt rod for the one to be replaced.

Other forms may be employed embodying the features of our invention instead of the one here explained, change being made in the form or construction, provided the elements stated by any of the following claims or the equivalent of such stated elements be employed, whether produced by our preferred method or by others embodying steps equivalent to those stated in the following claims.

We therefore particularly point out and distinctly claim as our invention:—

1. In a method of making connecting rods and bearings therefor, the steps which consist in forming a cylindrical hole in the large end of a connecting rod with its center accurately spaced a predetermined distance from the center of the hole in the upper end of said rod, making two semi-cylindrical flexible bearings, finishing said rod and bearings by assembling in such large end of said rod said two semi-cylindrical bearings of such dimensions that the distance between the center of the hole in the upper end of said rod and the center of the hole formed in the large end by said bearings is maintained, and compressing and flexing said bearings into substantially complete engagement against said rod and cap without disturbing the spacing between centers of said holes.

2. In a method of making connecting rods and bearings therefor, the steps which consist in forming cylindrical holes in the large ends of connecting rods with their centers accurately spaced a predetermined distance from the centers of the holes in the upper ends of said rods, making interchangeable semi-cylindrical flexible bearings, finishing said rods and bearings by assembling in such large ends of said rods said semi-cylindrical bearings of such dimensions that the distance between the centers of the holes in the upper ends of said rods and the centers of the holes formed in the large ends by said bearings is maintained, and compressing and flexing said bearings into substantially complete engagement against said rods and caps without disturbing the spacing between centers of said holes.

BENJAMIN F. HOPKINS.
JOHN V. O. PALM.